March 29, 1938.　　F. G. BLOCH　　2,112,555
THERMOMETER
Filed Jan. 9, 1937
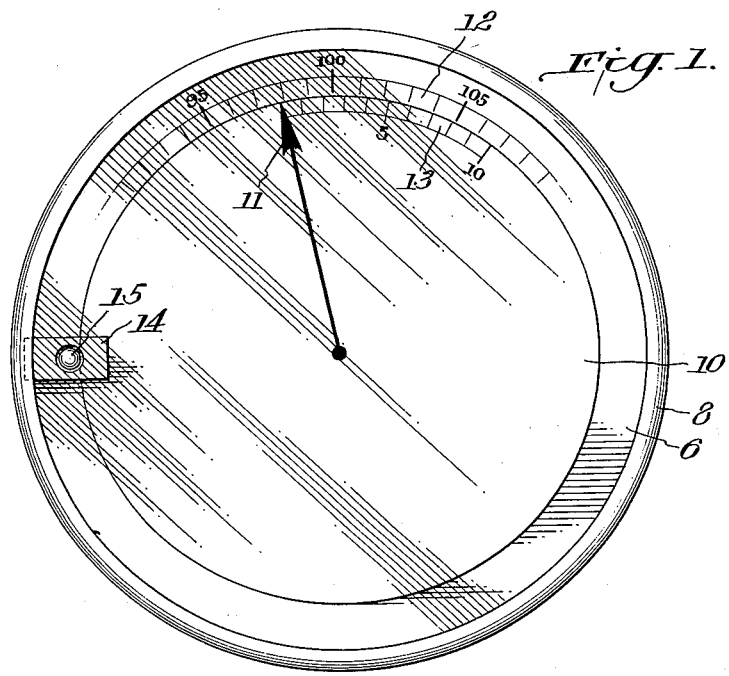
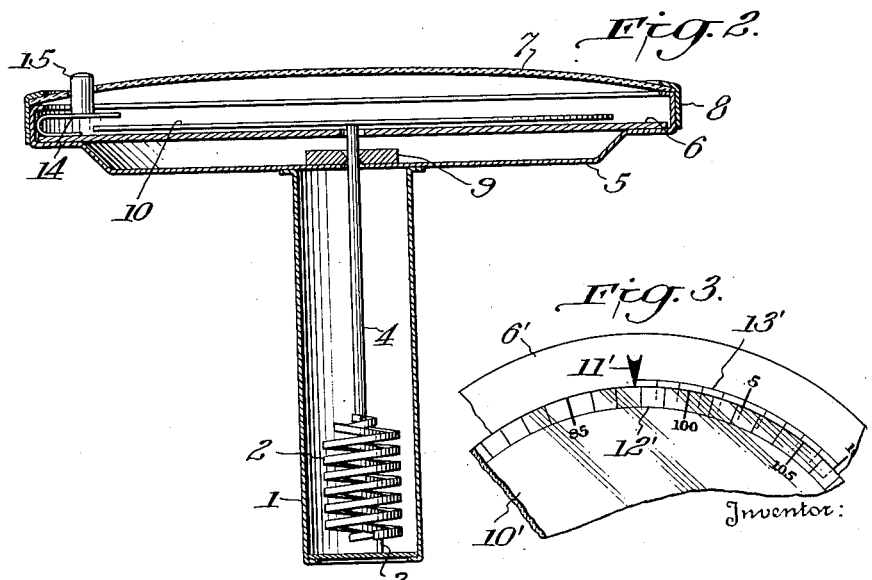

Patented Mar. 29, 1938

2,112,555

UNITED STATES PATENT OFFICE 2,112,555

THERMOMETER

Franz Georg Bloch, Leitmeritz, Czechoslovakia

Application January 9, 1937, Serial No. 119,856
In Czechoslovakia March 26, 1936

1 Claim. (Cl. 73—367)

This invention relates to thermometers and more particularly to thermometers of the bi-metallic strip type.

Thermometers such as disclosed and claimed in my prior Patent No. 1,970,219 can be manufactured with a high degree of accuracy, but the accuracy of the temperature readings is dependent upon the scale graduations. It is not practical to decrease the spacing of graduations to avoid interpolation since a powerful magnifying glass would then be necessary. A mechanical multiplier transmission for actuating the indicator from the thermally-responsive element is not possible since the available torque is not sufficient to operate such a system with accuracy.

An object of the invention is to provide a precision thermometer of the bi-metallic strip type, the thermometer having an open scale of graduations that may be read with ease and accuracy. An object is to provide a thermometer including a temperature-responsive coil unit for rotating a staff, and a graduation system including a dial element and a vernier element, one element being stationary and the other being mounted on the staff. A further object is to provide a thermometer of the type stated, in which the temperature-responsive element is exceedingly sensitive and operates with high accuracy, and a manually-operated clamp is provided to lock the staff in position during the reading of the scale indication.

These and other objects and advantages of the invention will be apparent from the following specification when taken with the accompanying drawing in which:

Fig. 1 is an enlarged plan view of an embodiment of the invention;

Fig. 2 is a similarly enlarged central section through the thermometer; and

Fig. 3 is a fragmentary plan view of a modified form of scale graduations.

In the drawing, the reference numeral 1 identifies the tubular shell in which the thermally-responsive multiple coil unit 2 is mounted. This bi-metallic coil is of the spiral type described in my prior patent and includes an outer coil having its lower end anchored to the shell 1 by a pin 3, an intermediate coil suspended from the upper end of the outer coil, and a central coil which is connected at its lower end to the intermediate coil and which has the staff 4 connected to its upper end. The staff 4 is "floated" upon the inner coil and takes an angular position corresponding to the sum of the temperature-produced angular displacements of the three coils.

A flat casing 5 is mounted on the tubular shell 1 and carries the scale plate 6, the casing having a cover glass 7 that is held in place by a ring 8. The staff 4 extends into the scale casing 5 and may be guided, when the shell 1 is relatively long by a substantially frictionless jewel bearing 9.

The staff 4 carries a flat segment or preferably, as shown, a complete disk 10 on which the pointer 11 is marked or etched. The pointer cooperates with an open scale of graduations 12 on the scale plate 6 and, to permit a reading of temperature with an accuracy commensurate to that of the sensitive bi-metallic coil unit 2, the disk 10 has vernier graduations 13. Ten graduations of the vernier correspond to nine graduations of the main scale 12 and the vernier graduation that alines with a main scale graduation therefore indicates the number of tenths of a scale space by which the pointer 11 has passed beyond the next lower main scale graduation.

Multiple coil bi-metallic elements are highly sensitive and respond quickly to temperature changes. When the temperature to be measured differs substantially from the atmospheric temperature, a few seconds' delay in the reading of the thermometer will result in an inaccurate measurement. Drifting of the pointer dial 10 during the reading of the instrument is prevented by the resilient clamp or stop 14 that may be depressed by the button 15 to lock the pointer disk 10 to the scale plate 6.

The scale markings shown in Fig. 1 are appropriate for a clinical thermometer and, with the parts in the positions illustrated, the measured temperature is 97.8° F. The scale graduations are of relatively large size on a small diameter scale, but the temperatures may be read quickly and with high accuracy.

The relative location of the main scale and vernier may be reversed, as shown in Fig. 3. The scale plate 6' has a pointer or fiducial mark 11' and a vernier 13', while the dial 10' carries the main graduated scale 12'. The disk 10' is of transparent material and projects partially over the stationary vernier graduations 13' to facilitate the reading of the thermometer.

It will be apparent that the invention is not restricted to the particular embodiment herein shown or described, or to any particular range of temperature measurements.

I claim:

A precision thermometer comprising a plurality of coaxially arranged spiral coils of bi-metallic strips, a staff supported solely by one of said coils, a flat indicating disk carried by said staff, a scale plate over which said indicating disk is moved angularly by said staff, said indicating disk and scale plate having cooperating sets of main graduations and vernier graduations, and a manually-operable stop for engaging said disk to lock the same against movement during the reading of the thermometer.

FRANZ GEORG BLOCH.